July 4, 1944.   R. E. DUNBAR   2,352,947
VACUUM CLEANER FAN SHAFT SEAL
Filed Feb. 3, 1942
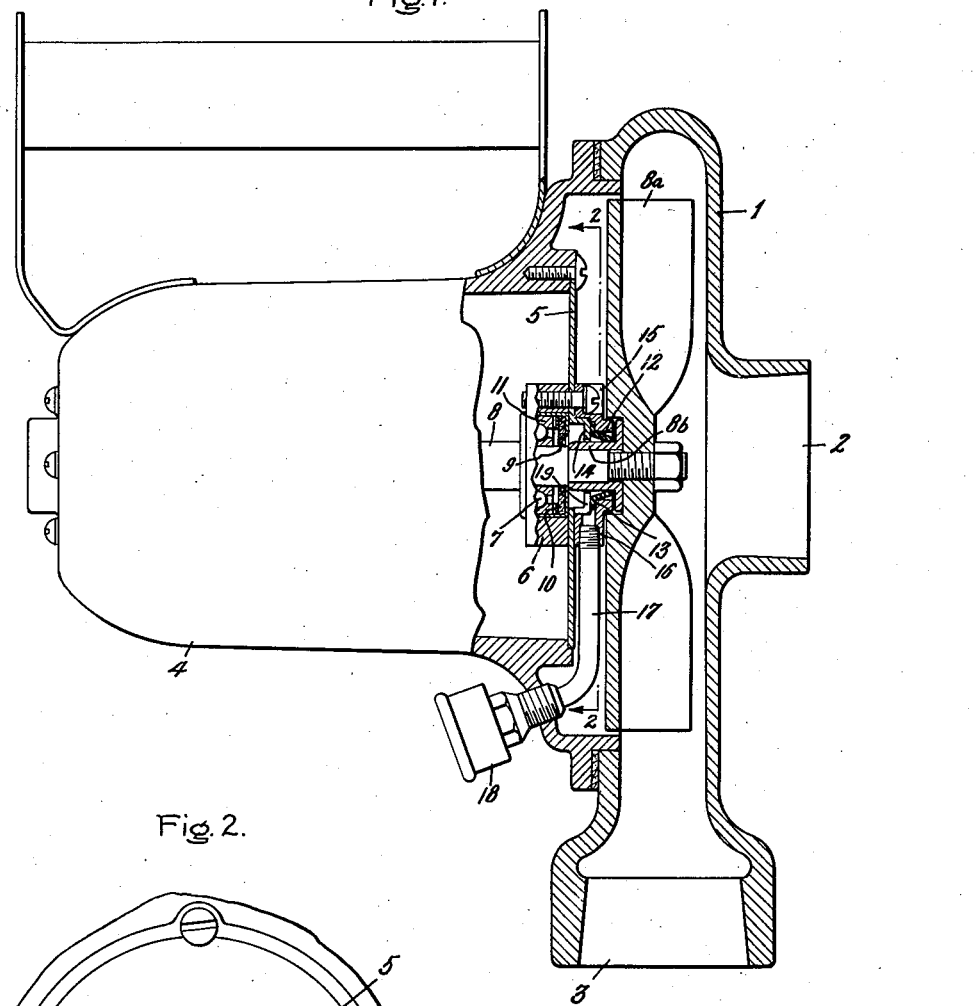
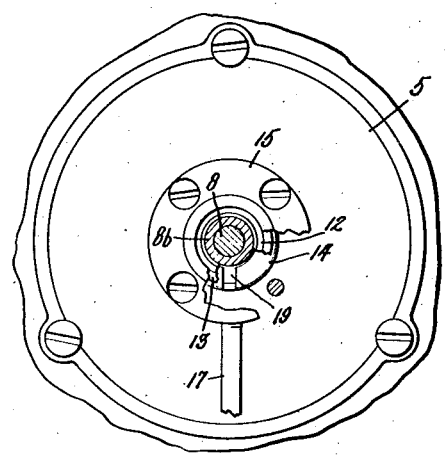
Inventor:
Ralph E. Dunbar,
by Harry E. Dunham
His Attorney.

Patented July 4, 1944

2,352,947

UNITED STATES PATENT OFFICE 2,352,947

VACUUM CLEANER FAN SHAFT SEAL

Ralph E. Dunbar, East Cleveland, Ohio, assignor to Electric Vacuum Cleaner Company, Inc., Cleveland, Ohio, a corporation of New York Application February 3, 1942, Serial No. 429,378

2 Claims. (Cl. 230—132)

The present invention relates to a sealing arrangement for the fan shaft of a vacuum cleaner or other device handling dirt-laden air.

The object of my invention is to provide an improved sealing arrangement for keeping dirt out of the fan shaft bearing, and for a consideration of what I believe to be novel and my invention, attention is directed to the following description and the claims appended thereto.

In the accompanying drawing, Fig. 1 is a sectional elevation of a vacuum cleaner having a sealing arrangement for the fan shaft embodying my invention; and Fig. 2 is a sectional view taken on line 2—2 of Fig. 1.

Referring to the drawing, there is shown a vacuum cleaner having a fan casing 1 provided with a suction inlet 2 for connection with a suction hose and an outlet 3 for connection with a bag or other suitable filter. At the rear of the fan casing is a motor housing 4 having a wall 5 which serves as a partition between the fan and motor housings and as a support for a bearing housing 6 enclosing an anti-friction bearing 7 in which the motor shaft 8 is journaled. A fan 8a having a hub 8b is fixed on the motor shaft. On the fan chamber side of the bearing housing is a grease seal which comprises a felt packing ring 9 compressed against the inner wall of the bearing housing and against the fan shaft by a spring washer 10 arranged between the felt packing ring and the raceway 11 of the bearing. The felt packing ring 9 is quite effective in retaining grease or lubricant within the bearing housing, but there is a tendency for dirt to work past the packing ring and mix with the lubricating grease and cause bearing failures. To keep dirt out of the bearing housing 6 I have provided a conical sealing member 12 of oil resistant rubber such as that sold under the trade name Perbunan. The sealing member 12 has an outwardly extending flange 13 which is clamped between the fan casing side of a hollow projection 14 on the wall 5 and a sealing ring 15 fixed to the wall 5. The sealing ring 15 is provided with a threaded aperture 16 into which is threaded a tube 17 carrying a grease cup 18. The threaded aperture 16 is in alignment with a slot 19 in the projection 14 and accordingly provides a passage for a fluid sealing medium such as a grease into the space between the projection 14 and the bearing housing 6. The sealing medium is kept out of the bearing housing by the packing ring 9. It is, however, free to flow into the space between the inner surface of the conical sealing member 12 and the fan hub 8b. The sealing medium cooperates with the sealing member 12 to provide a dirt seal. The inside diameter of the conical sealing member 12 is slightly less than the outside diameter of the fan hub 8b on which it bears so that the inherent resilience of the sealing member 12 tends to maintain a tight sealing contact. Despite the tightness of the sealing contact between the sealing member 12 and the fan hub, some dirt may in time work into the space between the sealing member 15 and the bearing housing 6, which space may be termed a sealing chamber. The dirt which works past the sealing member 12 ordinarily remains in the sealing medium adjacent the inner surface of the sealing member 12. At periodic intervals the addition of a new supply of sealing medium through the grease cup 18 forces the dirty sealing medium out past the sealing member 12 into the fan casing where it is picked up by the air. It is important that the conical sealing member 12 have less retaining ability than the felt sealing ring 9, as otherwise the addition of fresh sealing medium through the grease cup 18 would tend to force the dirty sealing medium into the bearing.

What I claim as new and desire to secure by Letters Patent of the United States, is:

1. In a vacuum cleaner, a fan chamber having an inlet and an outlet for dust-laden air, a fan shaft projecting into the fan chamber, a bearing housing for the shaft having a wall presented to the fan chamber and a lubricant retaining seal between the fan shaft and said wall behind which the bearing is located, a sealing chamber for retaining a fluid sealing medium on the fan chamber side of said seal, provisions for forcing sealing medium into said chamber, and a packing ring resiliently bearing on the fan shaft on the fan chamber side of said sealing chamber for retaining sealing medium in said sealing chamber, said packing ring having less retaining ability than said seal under the pressure built up upon forcing sealing medium into said chamber and being yieldable under said pressure whereby dirty sealing medium is forced into the fan chamber upon forcing sealing medium into the sealing chamber and the sealing medium is kept out of contact with the bearing.

2. In a vacuum cleaner having a fan shaft bearing in one wall of the fan chamber, a dirt seal for the bearing comprising a sealing chamber for holding a fluid sealing medium in contact with the fan shaft and out of contact with the bearing, provisions for supplying sealing medium to the chamber, and seals on the bearing and fan chamber sides of the sealing chamber the seal on the fan chamber side being looser than the seal on the bearing side and being yieldable under the pressure built up during the supplying of sealing medium to the chamber whereby upon supplying fresh sealing medium to the chamber, the excess sealing medium with any dirt which may have leaked past the seal will be forced into the fan chamber.

RALPH E. DUNBAR.